United States Patent [19]
Clark et al.

[11] Patent Number: 6,104,533
[45] Date of Patent: *Aug. 15, 2000

[54] VIEWFINDER WITH DIFFRACTIVE OPTICAL ELEMENT

[75] Inventors: Peter P. Clark, Boxborough; William T. Plummer, Concord, both of Mass.

[73] Assignee: Polaroid Corporation, Cambridge, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 09/154,116

[22] Filed: Sep. 16, 1998

[51] Int. Cl.⁷ .................................................. G02B 27/44
[52] U.S. Cl. ........................... 359/566; 359/19; 359/565; 359/570; 359/571; 359/574; 359/575; 359/744; 396/147; 396/148; 396/287; 396/296; 396/383
[58] Field of Search ..................... 396/147, 148, 396/287, 296, 380, 381, 383; 359/19, 565, 569, 570, 571, 574, 575, 744, 721, 795, 566

[56] References Cited

U.S. PATENT DOCUMENTS

| | | |
|---|---|---|
| 4,367,463 | 1/1983 | Suzuki et al. ............................ 340/700 |
| 4,436,398 | 3/1984 | Endo et al. .............................. 354/476 |
| 4,576,458 | 3/1986 | Cho et al. ................................ 354/199 |
| 4,604,329 | 8/1986 | Reber ....................................... 359/567 |
| 5,299,037 | 3/1994 | Sakata ........................................ 359/41 |
| 5,446,588 | 8/1995 | Missig et al. ............................ 359/565 |
| 5,473,471 | 12/1995 | Yamagata ................................ 359/569 |
| 5,555,129 | 9/1996 | Konno ..................................... 359/569 |
| 5,630,188 | 5/1997 | Ohashi ..................................... 396/385 |
| 5,664,244 | 9/1997 | Yamamura .............................. 396/296 |
| 5,715,090 | 2/1998 | Meyers .................................... 359/565 |
| 5,715,091 | 2/1998 | Meyers .................................... 359/565 |
| 5,966,244 | 10/1999 | Mukai ..................................... 359/647 |

FOREIGN PATENT DOCUMENTS 2 755 252   10/1996   France .
31 02 976 A1   1/1981   Germany .

OTHER PUBLICATIONS

Hecht–Zajac, "Optics", Addison–Wesley, p.84, 1979.
Iizuka, "Engineering Optics", Springer–Verlag, p.99, 1985.

*Primary Examiner*—Cassandra Spyrou
*Assistant Examiner*—Leo Boutsikaris
*Attorney, Agent, or Firm*—Barry Gaiman; Joseph Stecewycz

[57] ABSTRACT

An optical viewfinder system comprising two optical elements, and a field stop or a reticle, to provide an image of a scene to a viewer, and further comprising a diffractive optical element to provide a clear, stationary image of the field stop or reticle to the viewer.

16 Claims, 13 Drawing Sheets

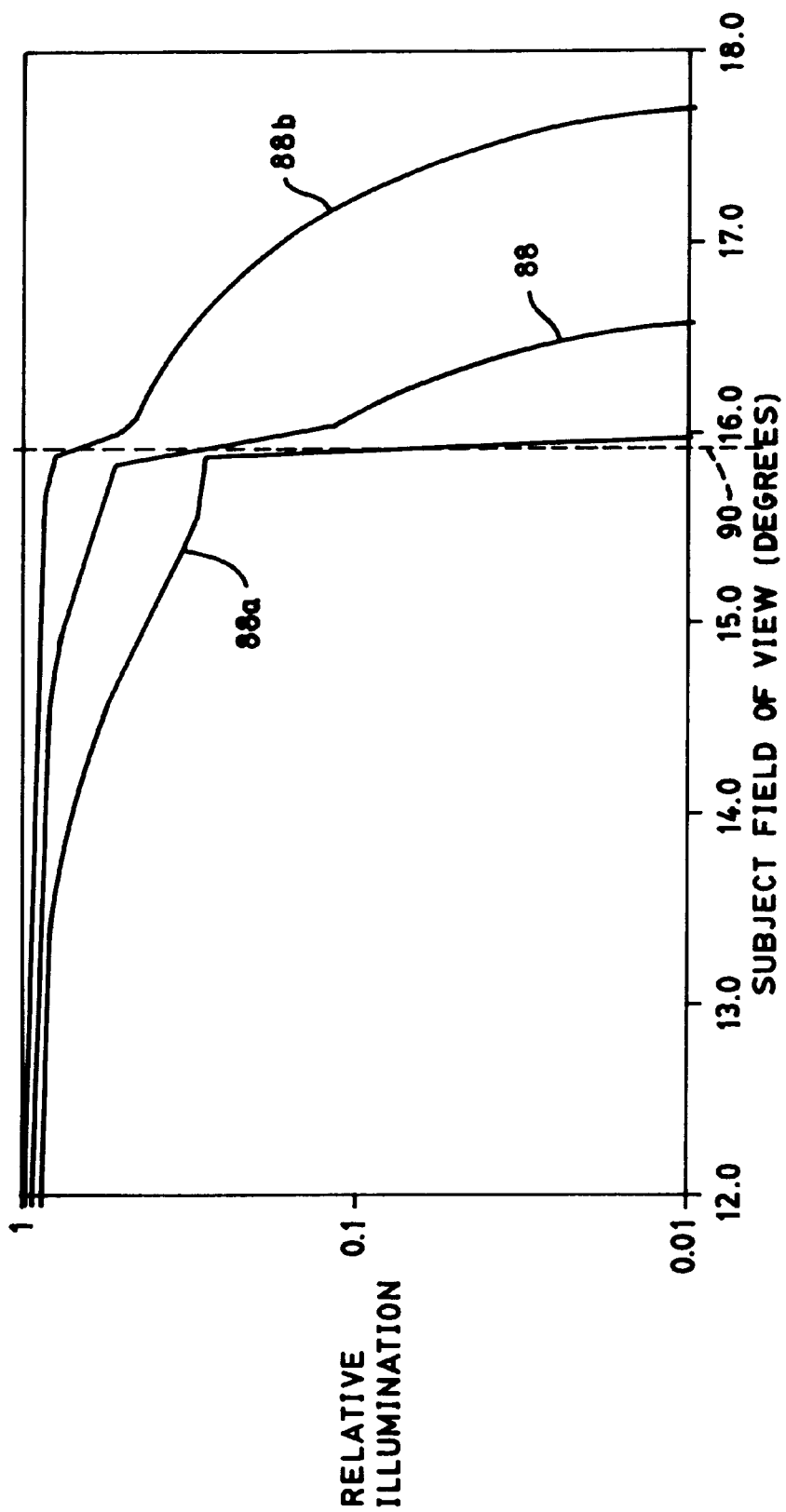

VIEWFINDER WITH DIFFRACTIVE OPTICAL ELEMENT

BACKGROUND OF THE INVENTION

1. Field of the Invention

This invention in general relates to the field of optical viewfinders and in particular to camera viewfinders incorporating a viewing frame.

2. Description of the Prior Art

The application of a reverse Galilean optical system as a relatively inexpensive camera viewfinder comprising two optical elements, an objective lens and an eye lens, with magnification less than unity, is known. A field-defining aperture, or field stop, is typically provided on the flat surface of the objective lens. This configuration provides the advantages of simplicity, minimal distortion, compactness, and an erect unreversed image.

However, the reverse Galilean optical system suffers from the limitation that, because no real, intermediate image is produced in the optical path, it is not possible to provide an in-focus image of the field stop. The viewer is required to make use of a blurry frame to determine the extent of the objective field. Consequently, the precise extent of the field of view is uncertain because of the resultant inaccuracy in the process of framing, and the precise direction of the field of view changes as the frame stop appears to shift with variance in the viewer's eye position.

The relevant art discloses various optical systems for providing visual information in a viewfinder. U.S. Pat. No. 4,576,458 issued to Cho et al. discloses a camera finder comprising holograms interposed between an objective lens and an eye lens. One or more reference beams are used to illuminate the holograms and provide a field frame, with parallax correction, in the viewfinder. A configuration in which an illuminated diffractive surface is used to display information, rather than project a frame, in the field of view is disclosed in U.S. Pat. No. 4,367,463 issued to Suzuki et al. In U.S. Pat. No. 5,299,037 issued to Sakata, an illuminated diffractive surface is disposed between layers of liquid crystal materials to provide information within a viewfinder. Such viewfinder configurations, however, require a source of illumination to provide the desired display information. The components necessary to provide such illumination add to the expense of the optical system.

Thus, there remains a need for a relatively inexpensive viewfinder optical system with an in-focus frame stop, and in which the position of the frame stop on the viewed scene is not affected by changes in the viewer's eye position. It is an object of the invention to provide for such a viewfinder.

Other objects of the invention will be obvious, in part, and, in part, will become apparent when reading the detailed description to follow.

SUMMARY OF THE INVENTION

The present invention discloses an optical viewfinder having a frame stop for defining a viewed scene. A diffractive optical element is provided in the optical path of the frame stop to image a viewing frame to a viewer where the frame appears in focus and remains relatively stationary, even with variation in the viewer's eye position.

Other features of the invention will be readily apparent when the following detailed description is read in connection with the drawings.

BRIEF DESCRIPTION OF THE DRAWINGS

The structure and operation of the invention, together with other objects and advantages thereof, may best be understood by reading the detailed description to follow in connection with the drawings in which unique reference numerals have been used throughout for each part and wherein:

FIG. 8 is a graph representing the field of view seen by an observer using a viewfinder in accordance with the present invention, each curve representing a different eye position relative to the optical axis of the viewfinder;

DESCRIPTION OF THE PREFERRED EMBODIMENTS

Figure 1:
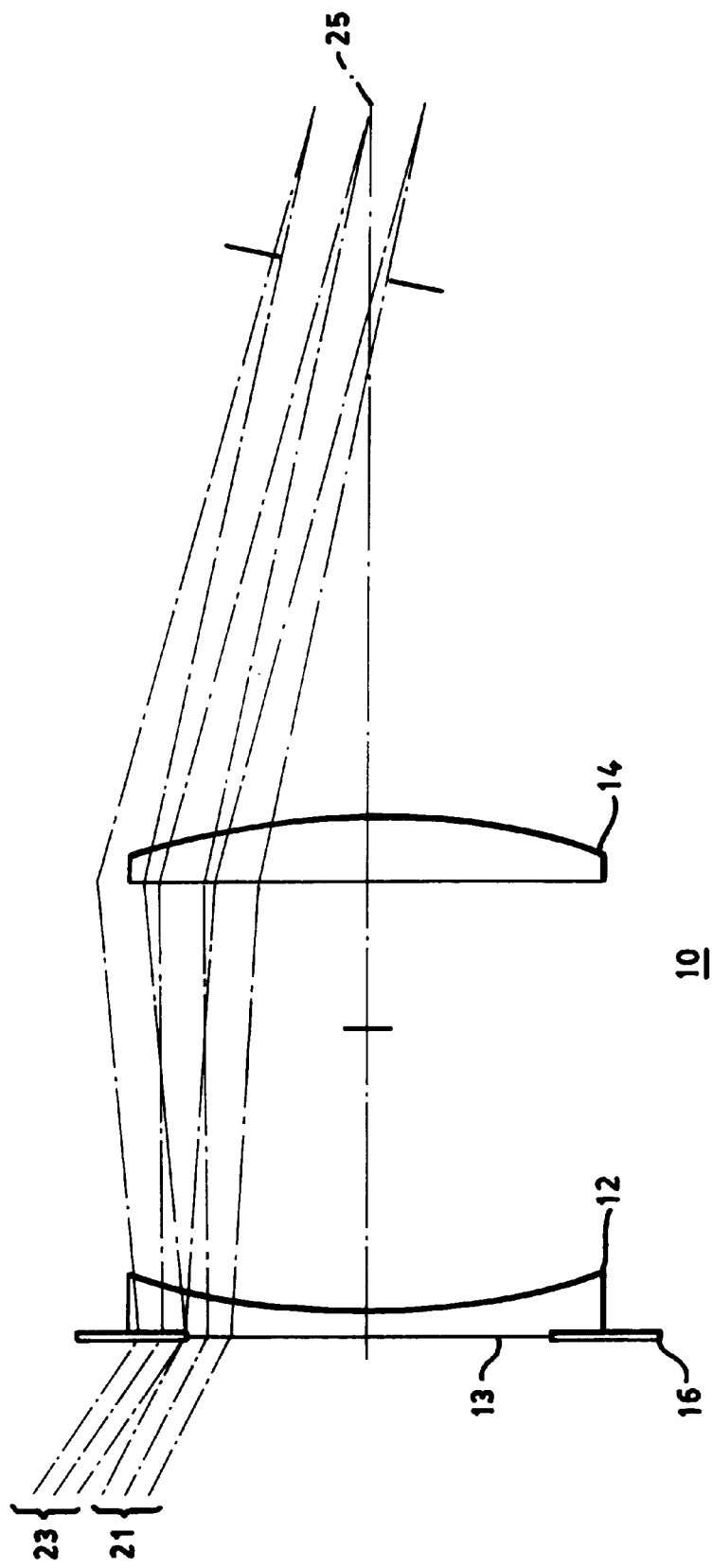
FIG. 1 is a diagrammatic cross-sectional representation of a conventional two-element Galilean viewfinder illustrating the emplacement of a frame on the first optical element.

There is shown in FIG. 1 a cross-sectional view of a conventional Galilean viewfinder 10 comprising an objective lens element 12 and an eye lens element 14. An optical display component, such as a reticle or a viewing frame 16 suitable for framing and composing, is typically positioned at a forward surface 13 of objective lens element 12. Optical beam 21 represents the first vignetted field point. Optical beam 23 represents the last vignetted field point, which is approximately the perceived edge of the viewed field. The center of rotation of the viewer's eye lies approximately at point 25.

Figure 2:
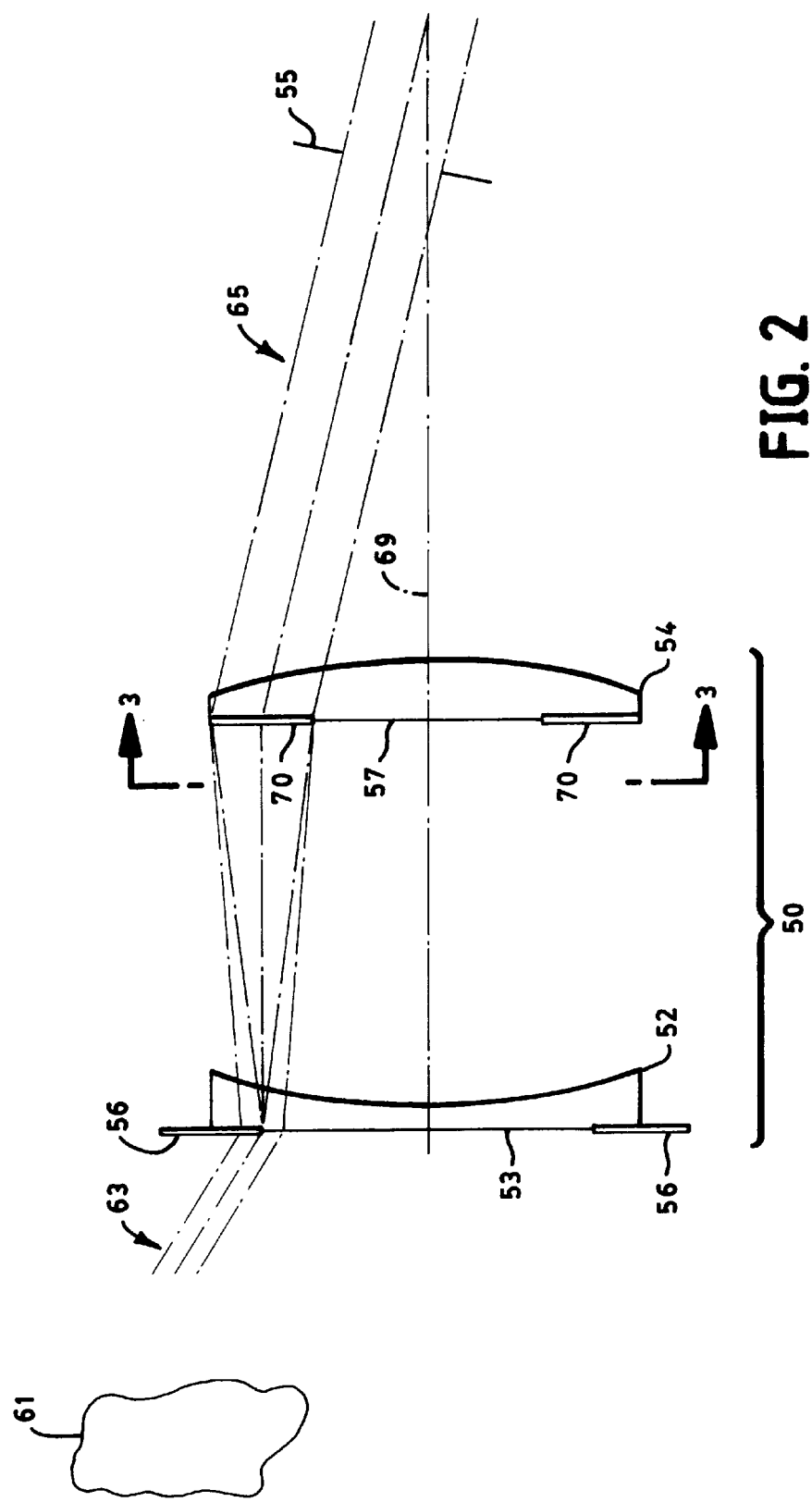
FIG. 2 is a diagrammatical cross-sectional representation of a viewfinder in accordance with the present invention comprising an objective lens with a field stop and an eye lens with a diffractive optical element disposed upon the eye lens.

There is shown in FIG. 2 a viewfinder 50 in accordance with the present invention comprising an objective lens 52, an eye lens 54, a field stop or frame 56, and a diffractive optical element 70 disposed upon a surface 57 of eye lens 54. The optical axes of objective lens 52 and eye lens 54 are coincident with a common axis 69. In a typical application, viewfinder 50 is disposed between a scene 61 to be viewed and a viewer's eye, represented by an iris opening 55.

Objective lens 52 preferably comprises an optical element of negative power and eye lens 54 comprises an optical element of positive power where the combination of objective lens 52 and eye lens 54 comprises a reversed Galilean system, as is well-known in the relevant art. Frame 56 may be disposed on a forward surface 53 of objective lens 52, as shown.

Optical beam 63, of wavelength $\lambda$, is incident upon frame 56 and represents the extent of the field of view of viewfinder 50. Optical beam 65, emitted from eye lens 54, represents the superimposed images of both scene 61 and frame 56, and is transmitted to iris opening 55 as an essentially collimated beam.

Figure 3:
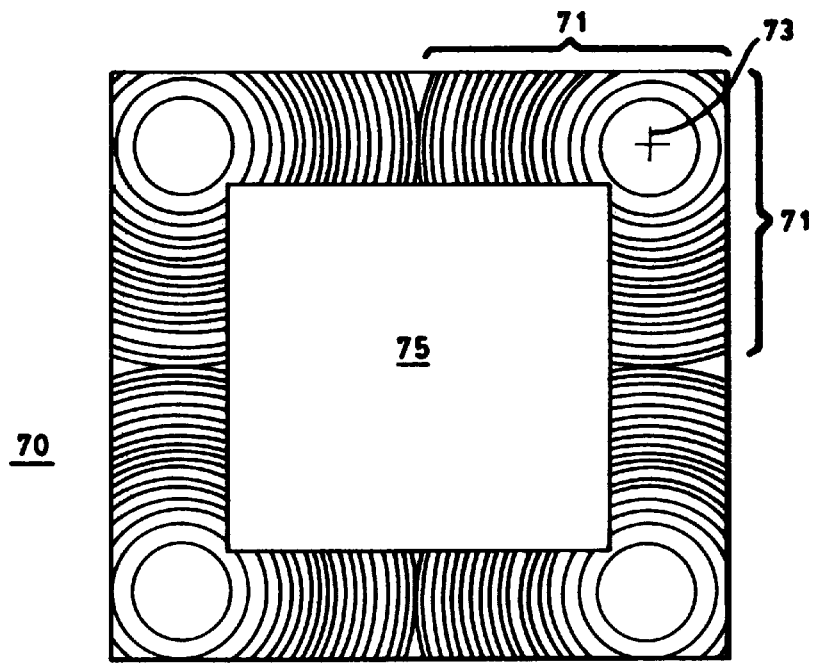
FIG. 3 is a plan view of the diffractive optical element of FIG. 2 as indicated by the arrows of FIG. 2.
Figure 4:
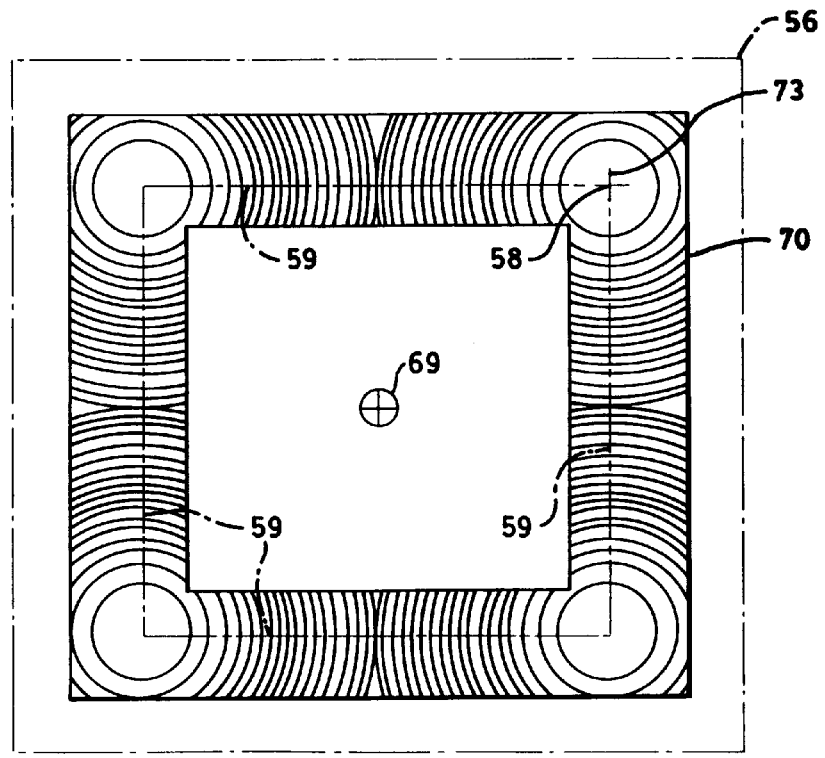
FIG. 4 is a view of the diffractive optical element of FIG. 3 over which a phantom representation of the field stop of FIG. 2 is superimposed.

In a first embodiment, as best seen in FIGS. 3 and 4, diffractive optical element 70 is configured as a rectangular component comprising a decentered diffractive optical region 71 at each corner of the rectangle. In the example provided, optical region 71 comprises a circular diffractive zone (i.e., having rotational symmetry) with a center 73. Diffractive optical element 70 may be integral to eye lens 54, or may be configured as a separate optical component, as described in greater detail below. If configured as a separate optical component, a central region 75 of diffractive optical element 70 may comprise either an opening or a planar layer of optically-transmissive material.

Frame 56 (here shown in phantom, for clarity) has an approximately rectangular shape, is disposed on common axis 69, and is aligned with diffractive optical element 70 such that each center 73 is optically coincident with a corresponding inside corner 58 of frame 56. In an alternative embodiment, frame 56 is replaced by a rectangular reticle (not shown) positioned at inside edge 59 of frame 56 such that the reticle is optically coincident with diffractive optical element 70. In such a configuration, both the viewed scene and the rectangular reticle will appear sharp and in focus to the viewer.

Figure 5:
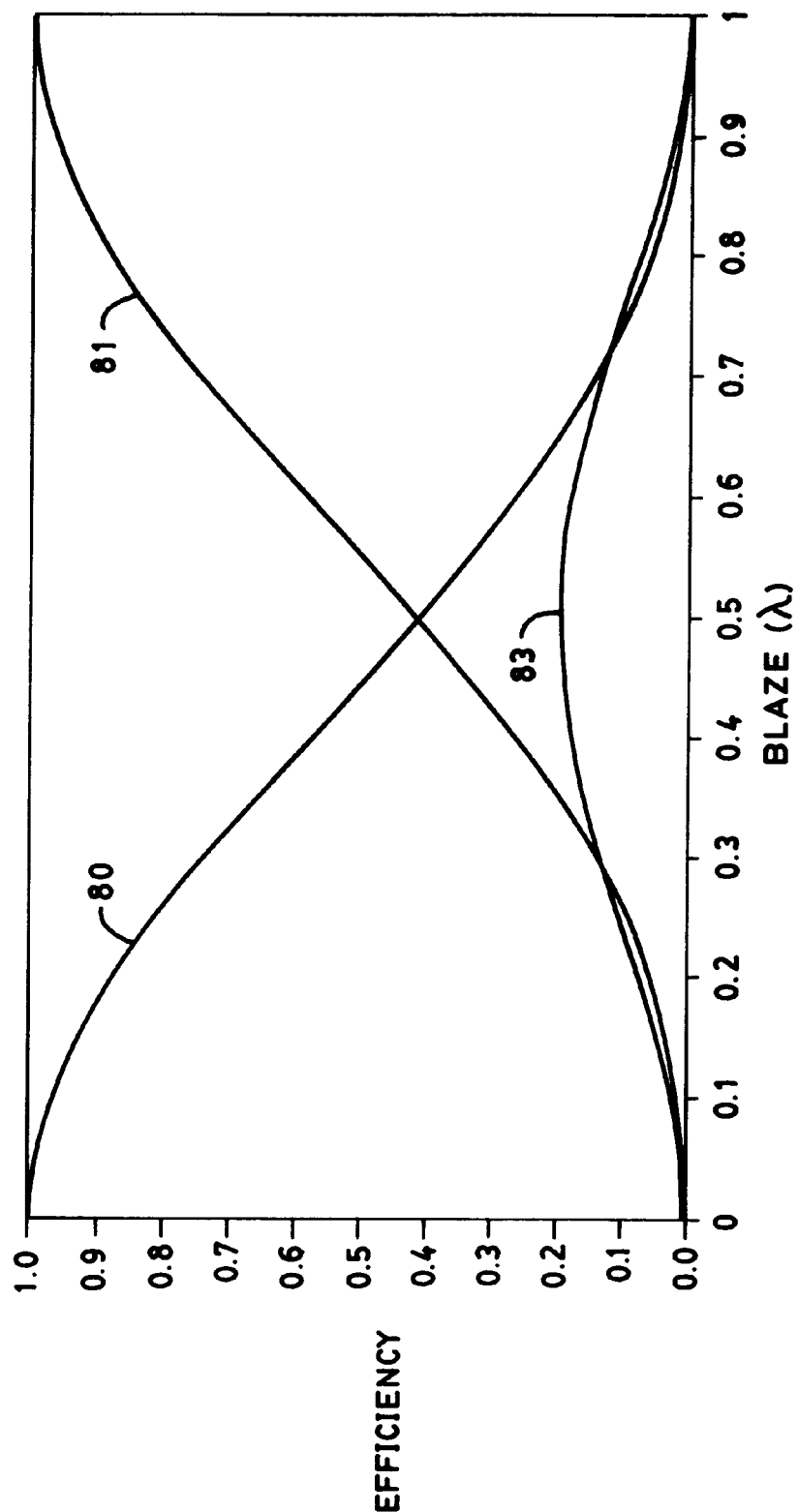
FIG. 5 is a graph showing transmission efficiencies of zeroth and first order diffraction emissions as a finction of blaze.

Optical region 71 comprises a zone plate structure of an efficiency such that both zeroth and first orders are transmitted in approximately equal ratios. As appreciated by one skilled in the relevant art, the efficiency of transmittal of optical radiation having wavelength $\lambda$ is a function of the blaze of the diffraction grating. This is illustrated in FIG. 5 in which are plotted a curve 80 giving the transmission efficiency of zeroth order radiation as a finction of blaze, a curve 81 giving the transmission efficiency of first order radiation, and a curve 83 giving the transmission efficiency of stray radiation (i.e., all other orders). In a preferred embodiment, a blaze of approximately $\lambda/2$ is used, giving zeroth and first order efficiencies of approximately 41% each, with about 18% of received optical radiation transmitted as stray radiation.

Figure 6A:
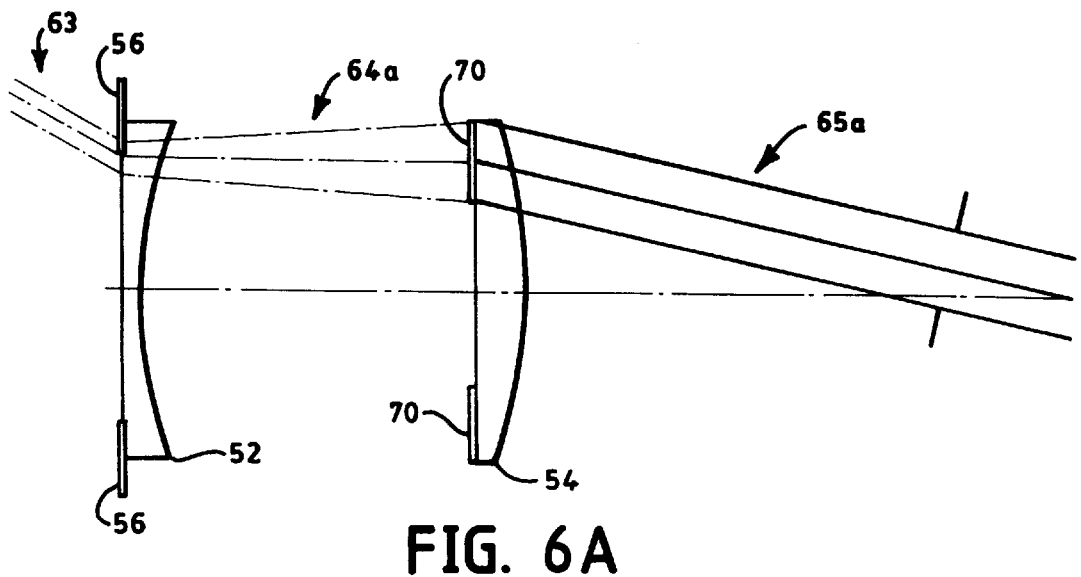
FIGS. 6A and 6B are, respectively, a diagrammatic representation of the projected rays of the viewed scene and the field stop showing coincidence of the transmitted rays.

Operation of viewfinder 50 can be explained in greater detail with reference to FIGS. 6A and 6B in which the above-described components retain the same reference numbers. In FIG. 6A, optical beam 63, which originates from a point in the viewed scene, passes through objective lens 52 and is transmitted as optical beam 64a. Optical beam 64a is incident upon diffractive optical element 70, and beam 65a is correspondingly transmitted as the zeroth order emission of diffractive optical element 70. The combination of objective lens 52 and eye lens 54 produces sufficient collimation of beam 65a to provide a comfortable image for the viewer.

Figure 6B:
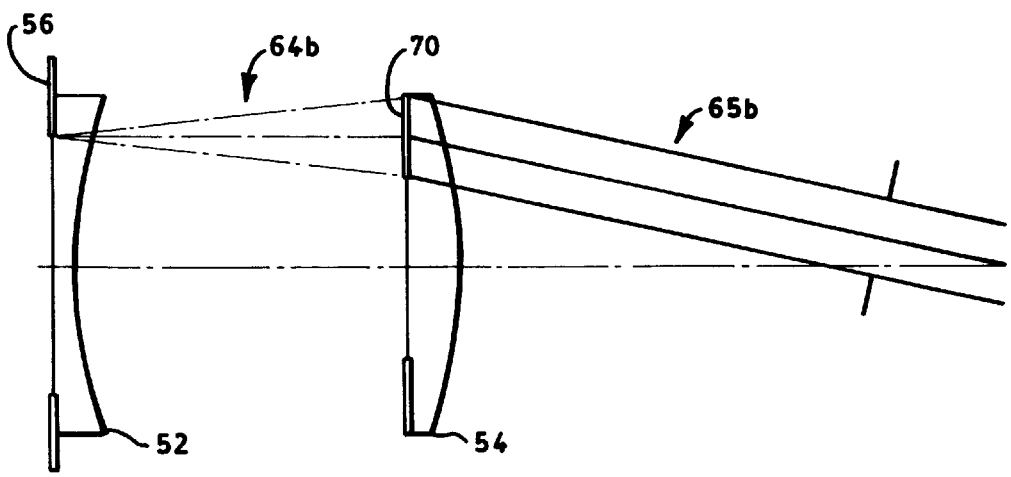

In FIG. 6B, optical beam 64b, which originates from a point on frame 56, passes through diffractive optical element 70 and beam 65b is correspondingly transmitted as the first order emission of diffractive optical element 70. The combination of diffractive optical element 70 and eye lens 54 provides sufficient collimation of beam 65b to provide a comfortable image for the viewer. Beam 65b is coincident with beam 65a to produce combined beam 65, best seen in FIG. 2, with the result that the viewer observes scene 61 which is defined by in-focus, stationary frame 56.

Figure 7A:
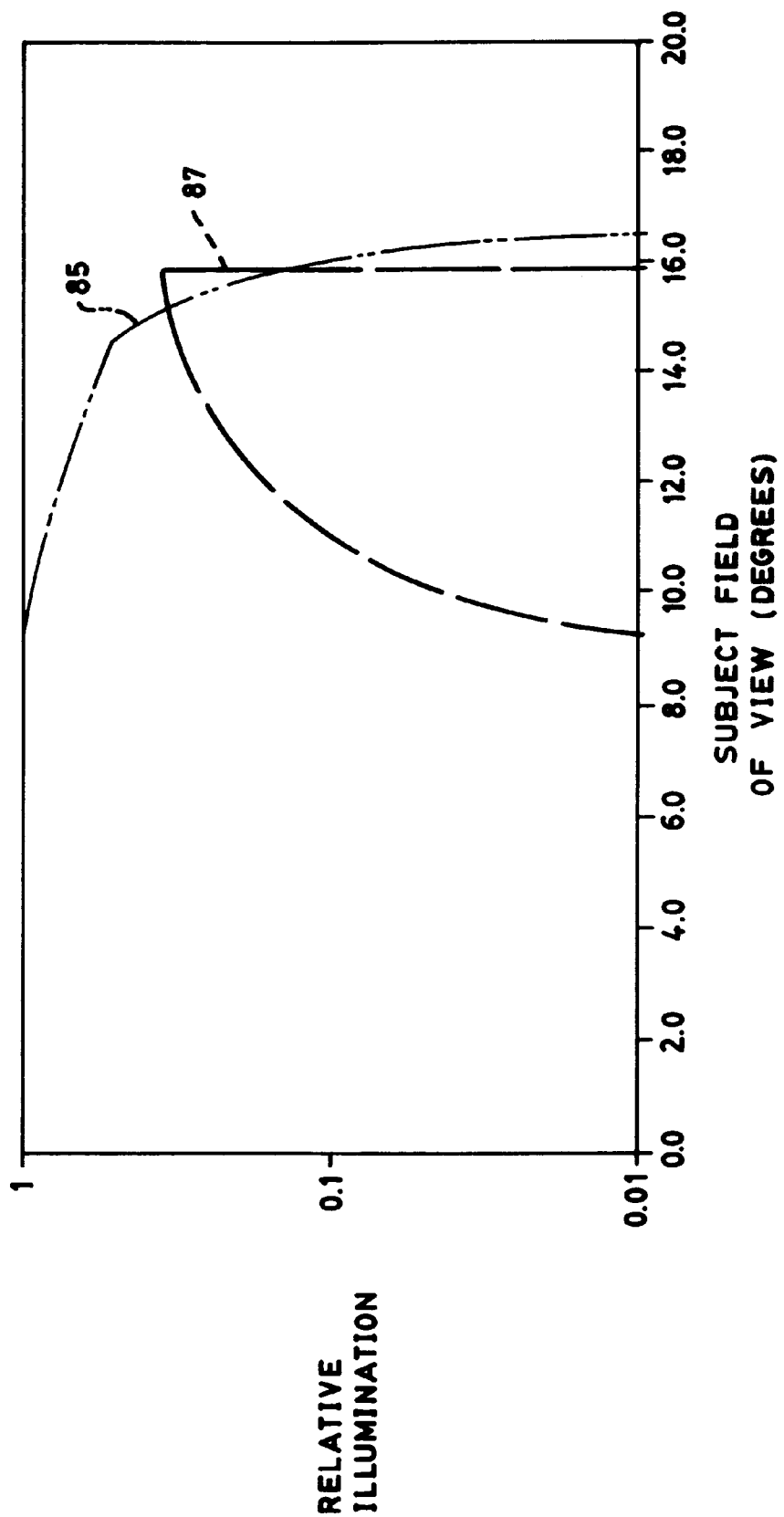
FIG. 7A is a graph illustrating field of view illumination for zeroth and first order diffraction emissions.
Figure 7B:
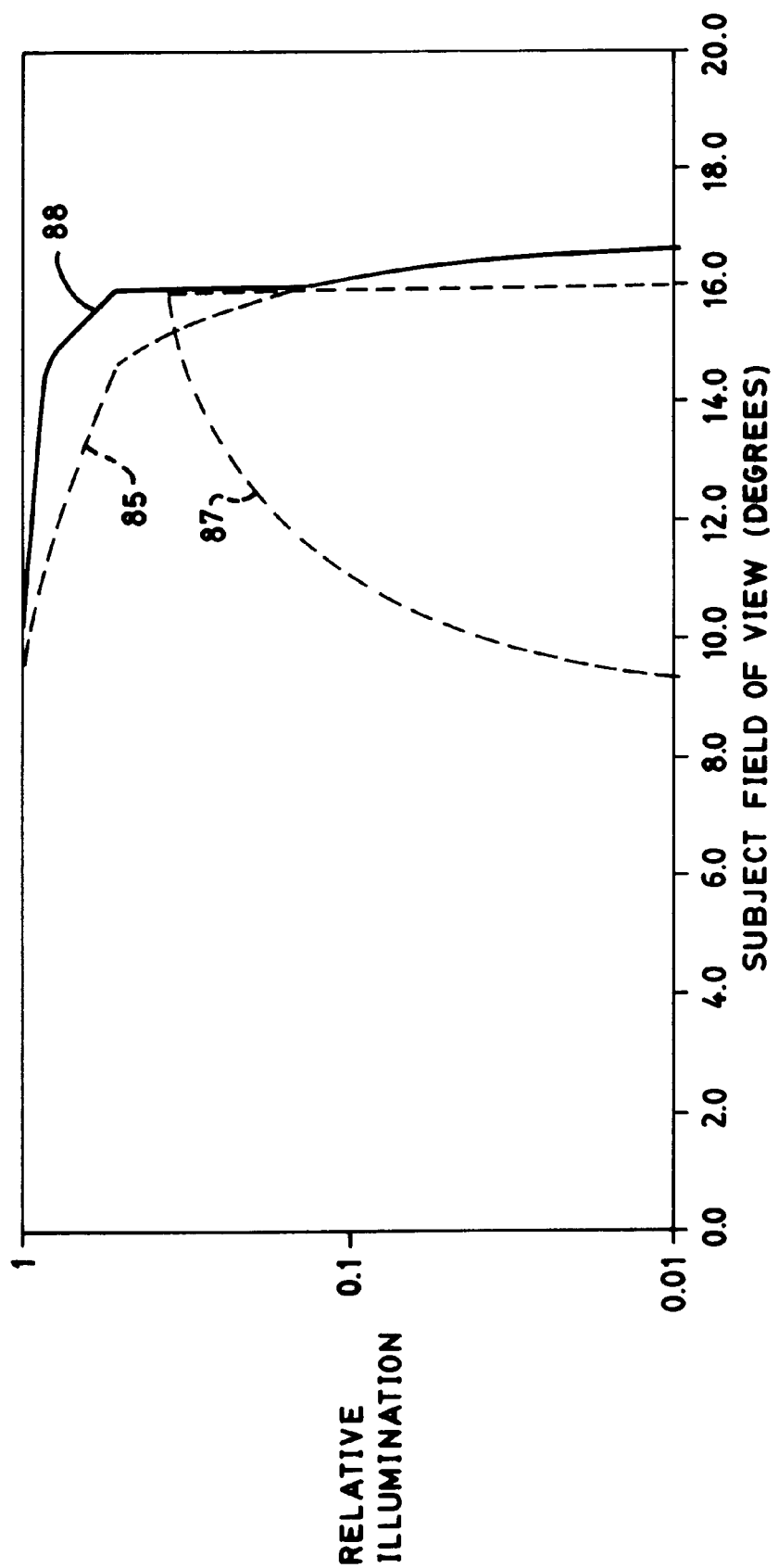
FIG. 7B is a graph illustrating field of view illumination for the frame stop, that is, the sum of the zeroth and first order diffraction emissions of FIG. 7A.

The resultant effect is illustrated in the graphs of FIGS. 7A and 7B. Curve 85 represents the relative illumination of the zeroth order emission as a function of the field of view, and curve 87 represents the relative illumination of the first order emission. The addition of curves 85 and 87, denoted by curve 88 (solid line), represents the image of frame 56 as perceived by the viewer. The sharp dropoff in intensity, near 16° field in the example shown, results in a sharp edge to the perceived frame.

Figure 9:
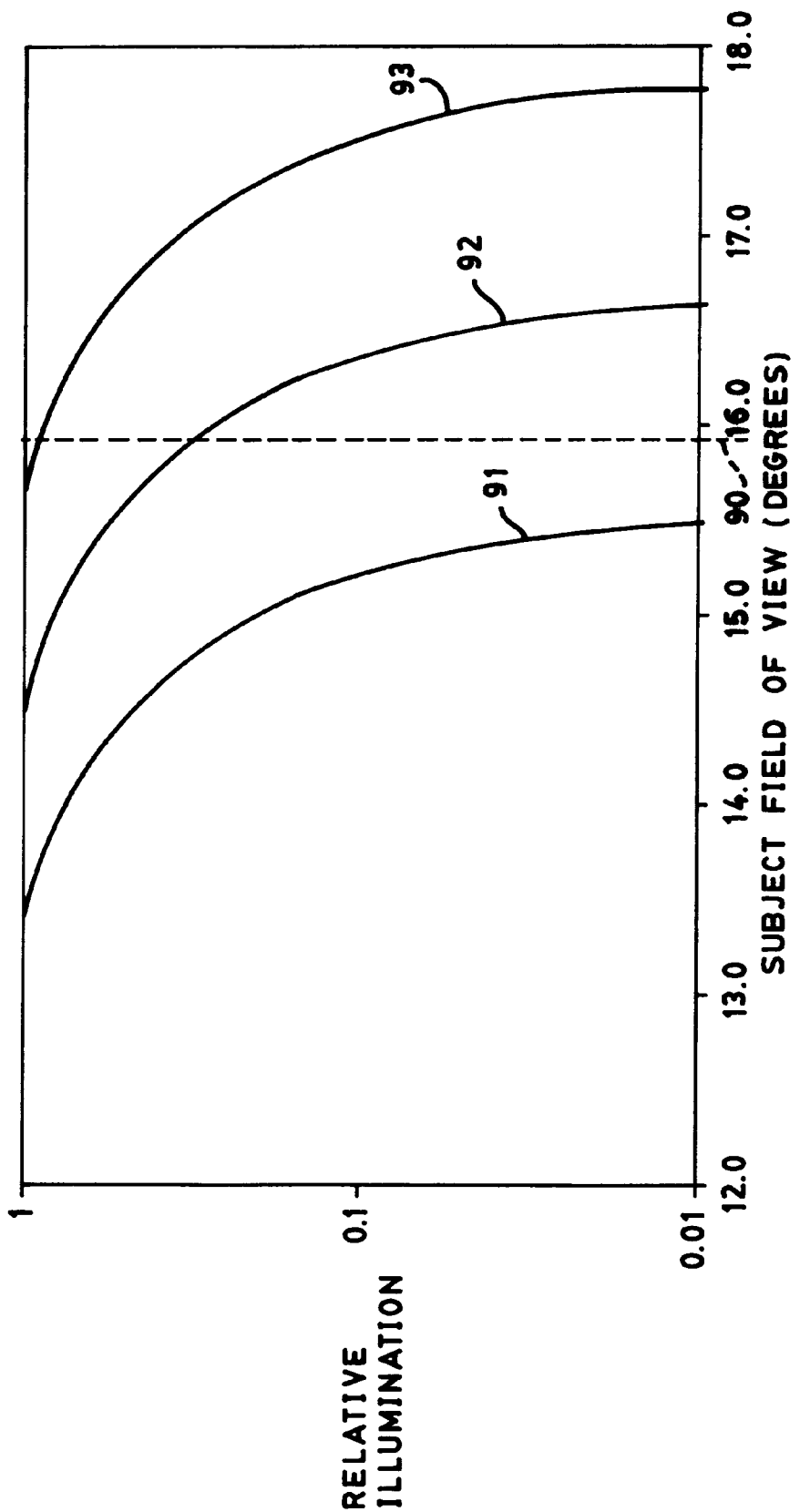
FIG. 9 is a graph representing the field of view seen by an observer using a conventional Galilean viewfinder, each curve representing a different eye position relative to the optical axis of the viewfinder.

A further advantage realized in a viewfinder configured in accordance with the present invention is illustrated in FIG. 8, where dotted line 90 represents the extent of the field of view of viewfinder 50. Curve 88 represents the relative illumination of a field stop as a finction of subject field of view for an observer positioned on the optical axis of the viewfinder. If the observer's eye moves up or down by 1 millimeter, the change in field of view, described by curves 88a and 88b respectively, changes little. In comparison, the graph of FIG. 9, in which curve 92 represents the view as in the graph of FIG. 8 except that the observer is using the conventional Galilean viewfinder of FIG. 1, shows a greater variance in field of view as a function of eye movement. If the observer's eye is displaced upward or downward by 1 millimeter, the field of view is shifted downward or upward, respectively, as described by curves 91 and 93. As can be appreciated by one skilled in the relative art, the apparent shift in position of a field stop with motion of an observer's eye is more pronounced in the Galilean viewfinder than in a viewfinder comprising a diffractive optical element configured in accordance with the present invention. Moreover, the edge seen in FIG. 8 appears more sharp than the edge perceived in FIG. 9.

Figure 10:
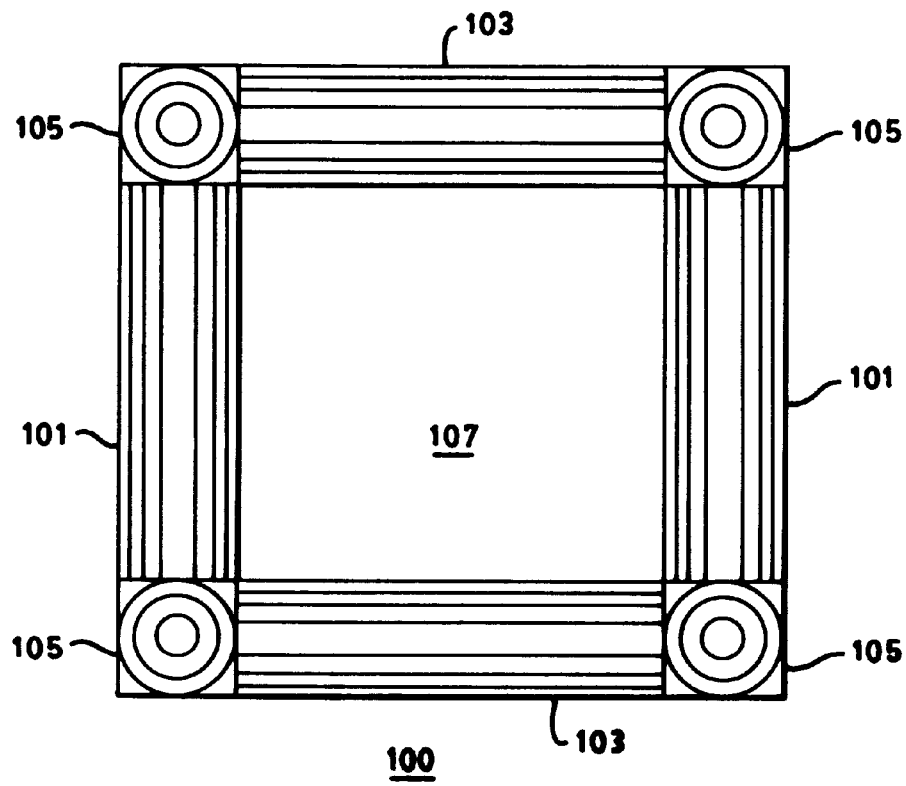
FIG. 10 is a plan view of an alternative diffractive optical element comprising diffractive side regions and diffractive corner regions.
Figure 15:
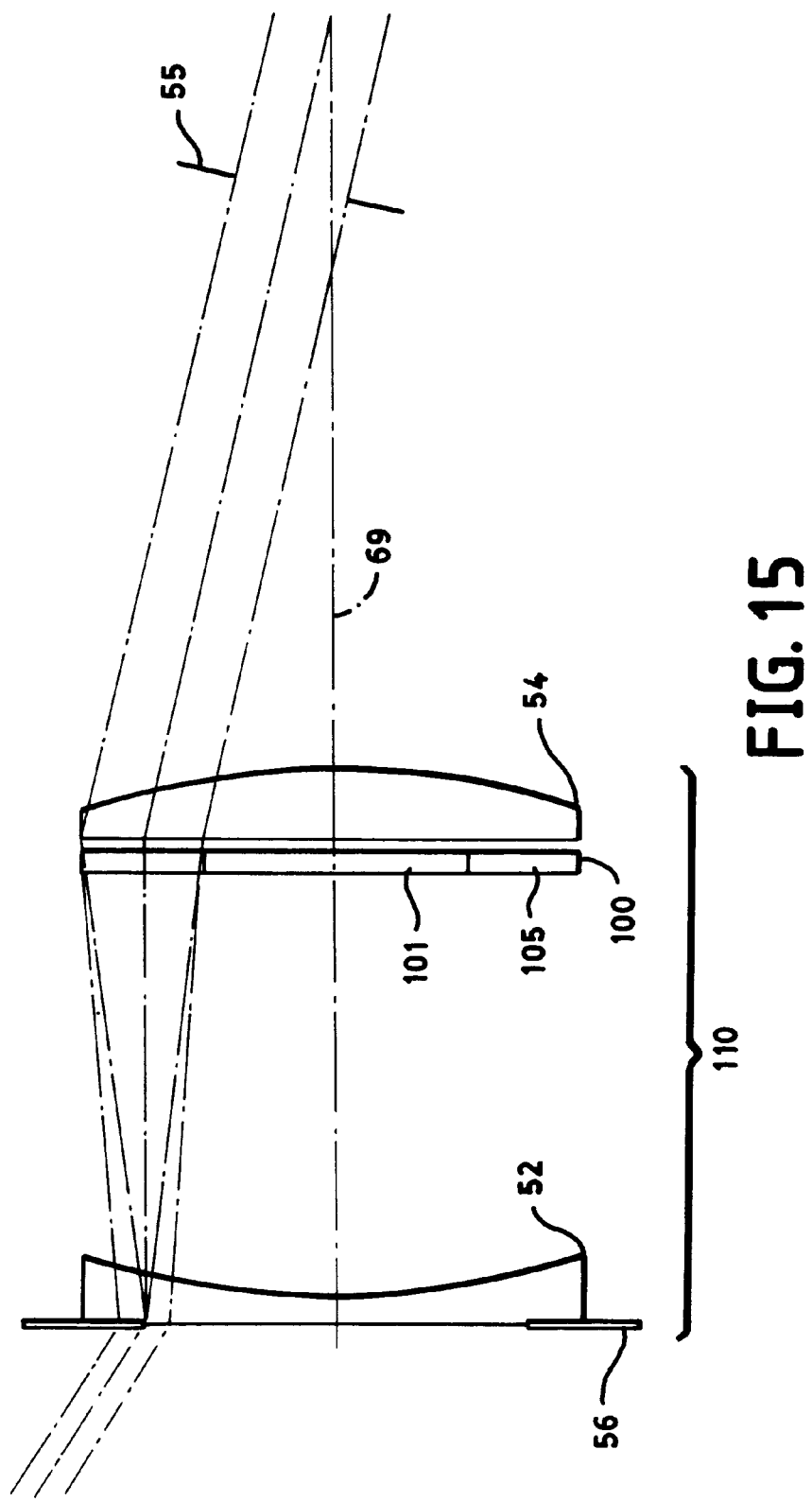
FIG. 15 shows an alternative embodiment of the viewfinder of FIG. 2 comprising an objective lens with a field stop and a diffractive optical element disposed proximate the eye lens.

In an alternative embodiment, a viewfinder 110, best shown in FIG. 15, comprises frame 56, objective lens 52, a diffractive optical element 100, and eye lens 54. In one embodiment, illustrated in FIG. 10, diffractive optical element 100 comprises diffractive side regions 101 and 103, and diffractive corner regions 105. In the embodiment shown, diffractive optical element 100 is a separate optical component and comprises a central planar layer of optically-transmissive material 107. However, it can be appreciated by one skilled in the relevant art that diffractive regions 101 and 105 may be disposed upon surface 57, or fabricated integrally with eye lens 54 (see FIG. 2).

Figure 11:
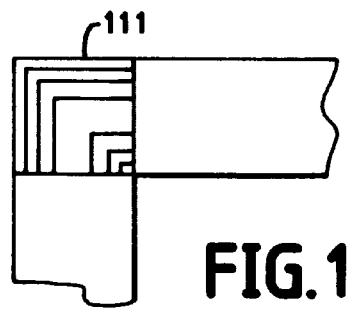
FIGS. 11 through 14 illustrate alternative corner region configurations for the diffractive optical element of FIG. 10.
Figure 12:
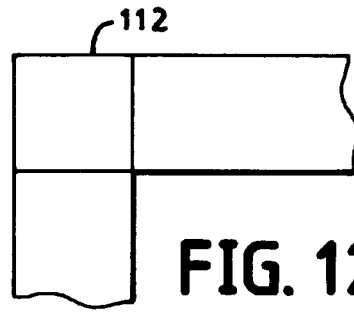
Figure 13:
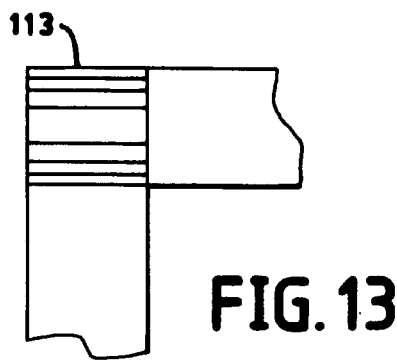
Figure 14:
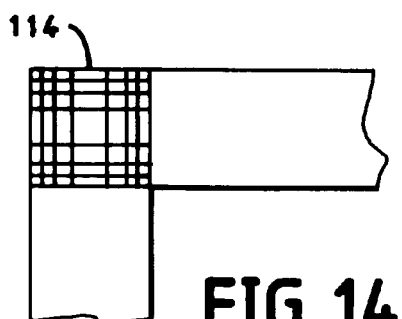

In the embodiment shown, diffractive side regions 101 and 103 comprise linear diffractive zones (i.e., having linear symmetry) and diffractive corner regions 105 comprise circular diffractive zones. In alternative embodiments, diffractive optical element 100 may comprise transitional diffractive corner regions 111 as in FIG. 11, blank corner regions 112 as in FIG. 12, continuous cylindrical corner regions 113 as in FIG. 13, or overlapping cylindrical corner regions 114 as in FIG. 14.

Figure 16:
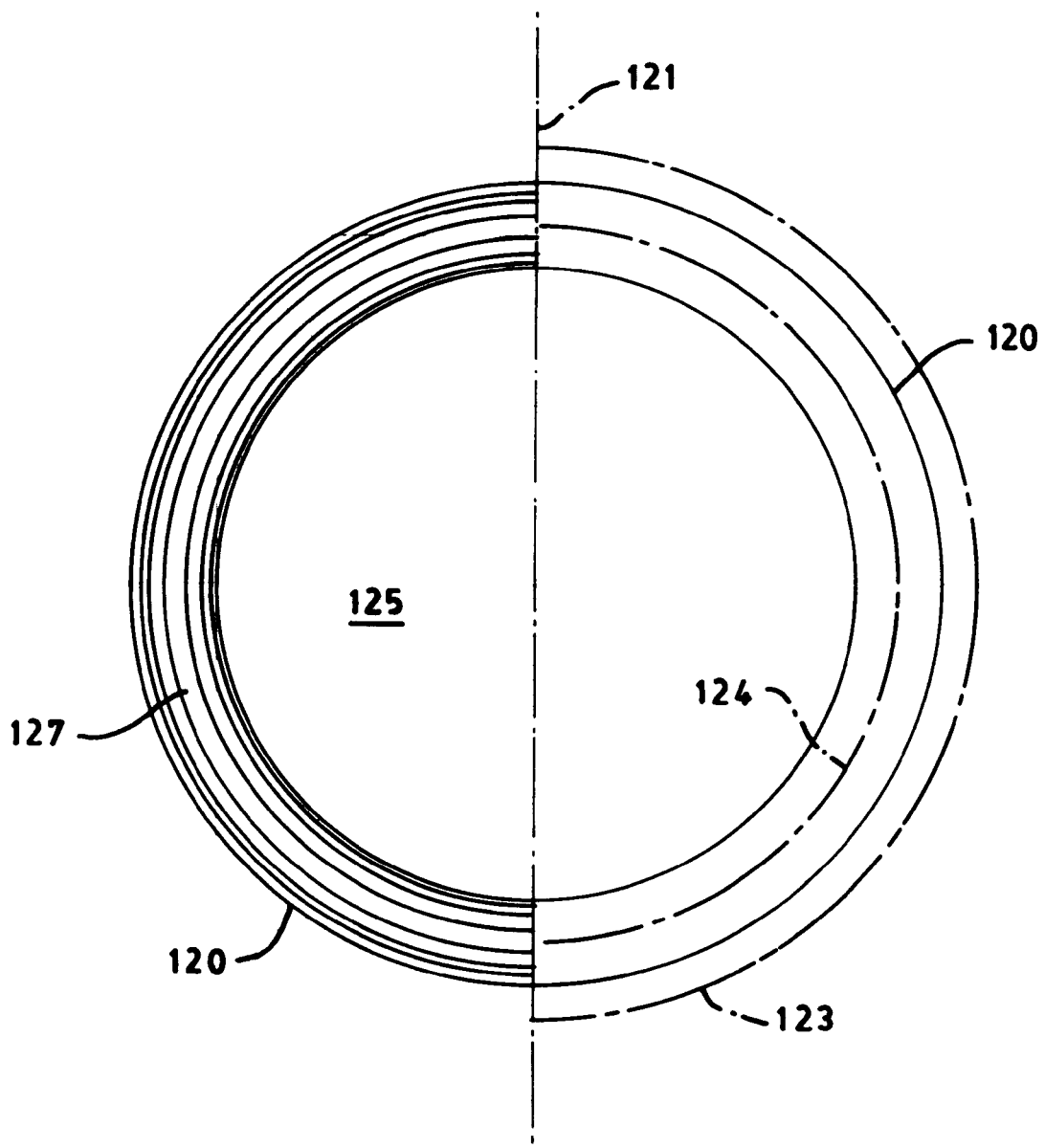
FIG. 16 is an alternative embodiment of the viewfinder of FIG. 2, the embodiment suitable for use with a circular field stop.

In another embodiment, shown in FIG. 16, viewfinder 110 comprises an annular diffractive optical element 120. Diffractive optical element 120 comprises a linear diffractive zone 127, shown in detail in the region to the left of a section line 121. As noted above, diffractive optical element 120 may be disposed upon or formed in the surface of an eye lens, or may be a separate optical element having a central region 125 comprising either an opening or an optically-transmissive material. Diffractive optical element 120 is most suitable for use with a circular frame 123, where an inner edge 124 of circular frame 123 is located within linear diffractive zone 127 as shown. For clarity of illustration, circular frame 123 is shown, superimposed in phantom on annular diffractive optical element 120, only in the region to the right of centerline 121. Alternatively, there could be provided a circular reticle (not shown), instead of circular frame 123, located at the position of inner edge 124 such that the reticle is optically coincident with the center of linear diffractive zone 127. In such a configuration, both the viewed scene and the circular reticle will appear clear and in focus to the viewer.

Figure 17:
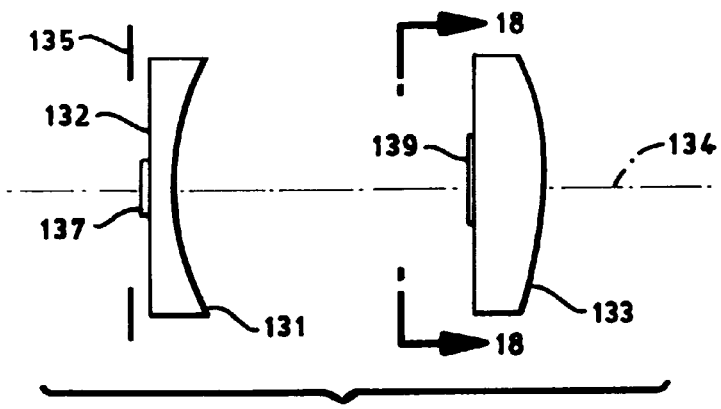
FIG. 17 is an alternative embodiment of the viewfinder of FIG. 2 wherein a reticle, instead of a field stop, is used at the objective lens and wherein a diffractive optical element is positioned at the eye lens on the optical axis of the viewfinder.
Figure 18:
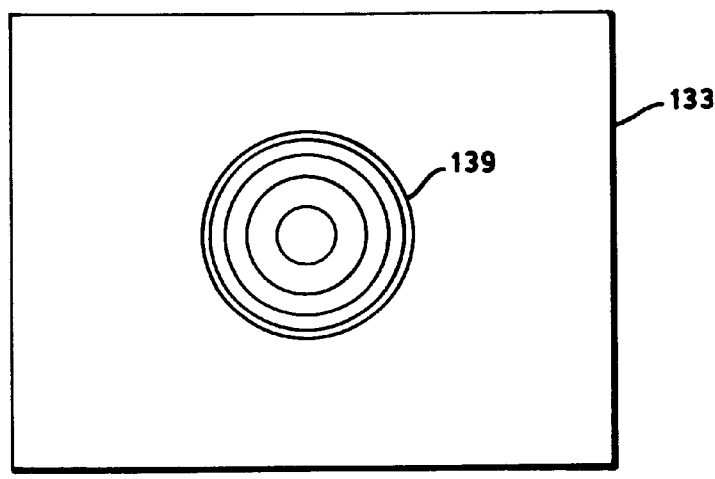
FIG. 18 is a view of the eye lens of FIG. 17 showing the diffractive optical element with rotational symmetry, that is, a circular diffractive zone; and, FIG. 19 is a view of the reticle of FIG. 17 as seen optically coincident with the diffractive optical element.
Figure 19:
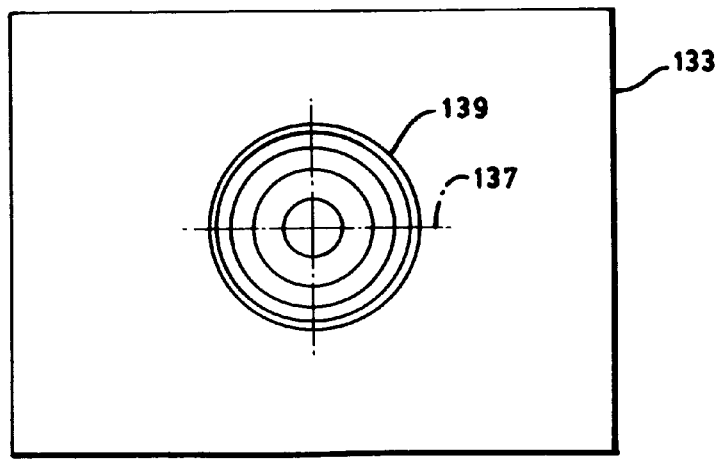

In yet another embodiment, shown in cross section in FIG. 17, a viewfinder 130 comprises an objective lens 131 with a reticle 137 disposed upon a forward surface 132, and an eye lens 133 with a diffractive optical element 139 disposed upon a surface 138. There may also be provided a field stop 135. Both reticle 137 and diffractive optical element 139 are located at an optical axis 134 of viewfinder 130. As best seen in FIG. 18, diffractive optical element 139 comprises a circular diffractive zone. As seen by the viewer, both the viewed scene and reticle 137 appear sharp and in focus, shown in FIG. 19.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. An optical system suitable for use with optical radiation of wavelength $\lambda$ for providing a framed scene at a viewer's eye, said optical system comprising:

an objective lens disposed between the scene and the viewer's eye;

an optical display component disposed along the optical axis of said objective lens;

an eye lens disposed along the optical axis of said objective lens such that the combination of said eye lens and said objective lens serves to image the scene at the viewer's eye;

an optical element, having an inner portion and an outer portion, said inner portion is devoid of diffractive power; and said outer portion comprises a plurality of diffractive optical elements disposed continuously on said outer portion; and said optical element, having a positive power, disposed between said optical display component and the viewer's eye such that the combination of said diffractive optical element and said eye lens serves to image said optical display component at the viewer's eye.

2. The optical system of claim 1 wherein said optical display component comprises a field stop configured as a frame defining a field of view.

3. The optical system of claim 1 wherein said optical display component comprises a reticle.

4. The optical system of claim 1 wherein said diffractive optical element is disposed upon a surface of said eye lens.

5. The optical system of claim 1 wherein said diffractive optical element comprises a planar section of optically-transparent material, said planar section disposed in the optical path between the scene and the viewer's eye.

6. The optical system of claim 1 wherein said diffractive optical element comprises a diffractive grating such that optical rays from the scene are transmitted as zeroth order rays to the viewer's eye and optical rays from said frame are transmitted as first order rays to the viewer's eye.

7. The optical system of claim 6 wherein said diffractive optical element has a zeroth order diffraction efficiency of 80% or less.

8. The optical system of claim 1 wherein said diffractive optical element comprises a blazed diffractive grating with a blaze of approximately $\lambda/2$.

9. The optical system of claim 1 wherein said diffractive optical element comprises circular diffracting zones.

10. The optical system of claim 1 wherein said diffractive optical element comprises linear diffracting zones.

11. The optical system of claim 1 wherein said diffractive optical element comprises a rectangular shape.

12. The optical system of claim 1 wherein said diffractive optical element comprises a circular shape.

13. An optical system suitable for use with optical radiation of wavelength $\lambda$ for providing a framed scene at a viewer's eye, said optical system comprising:

an objective lens disposed between the scene and the viewer's eye;

a reticle disposed upon a surface of said objective lens;

an eye lens disposed along the optical axis of said objective lens such that the combination of said eye lens and said objective lens serves to image the scene at the viewer's eye;

an optical element, having an inner portion and an outer portion, said inner portion is devoid of diffractive power; and said outer portion comprises a plurality of diffractive optical elements disposed continuously on said outer portion; and said optical element, having a positive power, disposed in the optical axis of said optical system such that the combination of said diffractive optical element and said eye lens serves to image said reticle at the viewer's eye.

14. The optical system of claim 13 wherein said diffractive optical element has a zeroth order diffraction efficiency of 80% or less.

15. The optical system of claim 13 wherein said diffractive optical element comprises a blazed diffractive grating with a blaze of approximately $\lambda/2$.

16. The optical system of claim 13 wherein said diffractive optical element comprises a circular diffracting zone.

* * * * *